(12) United States Patent
Deppe et al.

(10) Patent No.: US 7,444,530 B2
(45) Date of Patent: Oct. 28, 2008

(54) STANDBY CIRCUIT FOR AN ELECTRICAL DEVICE

(75) Inventors: Carsten Deppe, Aachen (DE); Peter Luerkens, Aachen (DE); Thomas Duerbaum, Langerwehe (DE); Matthias Wendt, Wuerselen (DE); Christoph Loef, Aachen (DE); Georg Sauerlaender, Aachen (DE)

(73) Assignee: NXP B.V., Eindhoven (NL)

( * ) Notice: Subject to any disclaimer, the term of this patent is extended or adjusted under 35 U.S.C. 154(b) by 1536 days.

(21) Appl. No.: 10/071,391

(22) Filed: Feb. 6, 2002

(65) Prior Publication Data

US 2002/0190797 A1   Dec. 19, 2002

(30) Foreign Application Priority Data

Feb. 10, 2001   (DE) ............................... 101 06 132

(51) Int. Cl.
*H04N 5/50*   (2006.01)
*H02J 1/00*   (2006.01)

(52) U.S. Cl. ...................... 713/323; 713/300; 713/310; 713/320; 713/321; 713/322; 713/330; 713/340; 348/734

(58) Field of Classification Search ................. 713/300, 713/310, 320–324, 330, 340; 348/734
See application file for complete search history.

(56) References Cited

U.S. PATENT DOCUMENTS

| | | | | |
|---|---|---|---|---|
| 4,668,044 A | * | 5/1987 | D'Auria et al. | 385/92 |
| 5,414,475 A | * | 5/1995 | Trzyna et al. | 348/730 |
| 5,566,340 A | * | 10/1996 | Stewart et al. | 713/323 |
| 6,107,698 A | * | 8/2000 | Ochiai et al. | 307/43 |
| 6,144,566 A | * | 11/2000 | Keller | 363/21.12 |
| 6,225,709 B1 | * | 5/2001 | Nakajima | 307/66 |
| 6,292,233 B1 | * | 9/2001 | Erba et al. | 348/730 |
| 6,317,340 B1 | * | 11/2001 | Niederreiter | 363/41 |
| 6,462,437 B1 | * | 10/2002 | Marmaropoulos et al. | 307/125 |
| 6,496,390 B2 | * | 12/2002 | Yang | 363/21.07 |
| 6,800,961 B2 | * | 10/2004 | Basso | 307/43 |
| 6,810,216 B1 | * | 10/2004 | Tourunen | 398/202 |
| 7,221,285 B1 | * | 5/2007 | Hamilton | 340/825.72 |

* cited by examiner

*Primary Examiner*—Abdelmoniem Elamin

(57) ABSTRACT

The invention relates to a standby circuit, an electrical device with a standby circuit, a method for the control of the electrical device and a power supply assembly. Whereas the power supply unit and the control electronics are in permanent operation when conventional devices are in the standby mode and consequently have a high power consumption, the invention proposes a solution for saving energy while retaining convenience of operation by which the power supply unit is switched off in the standby mode. A standby circuit, preferably fed by an energy buffer element, remains active in the standby mode and monitors signal inputs for activation events. When an activation event occurs, the standby circuit switches on the power supply unit.

19 Claims, 8 Drawing Sheets

STANDBY CIRCUIT FOR AN ELECTRICAL DEVICE

The invention relates to a standby circuit, an electrical device with a standby circuit, a method of controlling an electrical device and a power supply module.

A great number of electrical devices, such as video recorders, satellite receivers, television sets, set-top boxes, computer monitors, etc., have a so-termed standby mode. These devices are supplied with electric energy from the electricity mains. For this purpose, they have corresponding power supply units. In addition to 50 Hz transformer-based power supplies, SMPSs (switched-mode power supplies) are also very often used in this case. Switched-mode power supplies work with a stabilized or unstabilized D.C. input voltage, which is usually drawn from the mains by means of a rectifier. One or more electronic switches are used to convert this D.C. voltage into an A.C. voltage or A.C. current, whose frequency is usually high (i.e. greater, often even many times greater than the mains frequency). The A.C. voltage or A.C. current is used for further voltage transformation and power transmission, respectively, for the generation of one or more D.C. and/or A.C. voltages. A distinctly higher switching frequency in comparison to the mains frequency makes possible the use of very much smaller magnetic components. Control of the output voltage is possible by means of a suitable switch control method (e.g. frequency control, pulse duty factor control or other methods known to the expert).

Devices such as televisions are often equipped with a circuit breaker by which the power supply unit is completely isolated from the mains and in this way the device is switched off "hard", i.e. electrically completely isolated from the mains, by means of a mechanical switch, for example. In this off position the device does not consume any electrical energy. However, a device can also be switched to the standby mode, for example, by pressing the "off" button on a standard wireless remote control, e.g. a radio or infrared remote control. Then the functional units of the device (here for example the picture tube, the receiver element, etc.) are switched off, usually with relays or electronic switches or through drastic reduction in the secondary side supply voltage. In standby mode, however, the power supply unit is not isolated from the mains, because at least one unit of the device, here designated "standby circuit", remains active in the standby mode.

In conventional devices the standby circuit frequently encompasses the whole of the control electronics with a central microcontroller. It draws its power from the device's power supply unit. In the case of an infrared remote control, for example, in standby mode the standby circuit is constantly monitoring any incoming infrared red remote control signals. Such incoming signals are decoded, the microcontroller deciding whether a received signal represents an activation event. The term "activation event" refers here to those events that are intended to lead to the device being switched on. In the case of a television for example this could be a press on the on/off button on the remote control or the actuation of one of the numerical program buttons. If such a signal is received, decoded and recognized by the standby circuit, the standby circuit switches the functional units on again, so that the device is in full operating mode.

Practice has shown that consumers almost permanently operate many devices, in particular entertainment electronics devices, in standby mode and do not isolate them from the mains, because it is only in standby mode that convenience functions, such as switching on by remote control or time-controlled switching on (e.g. video recorders) or switching on controlled by the input signal (e.g. video recorders with a VPS signal or computer monitors by video signal), are possible.

A number of devices no longer have a "hard", i.e. mechanical, mains switch at all. Because of the high requirements, especially of insulation, current load and cable routing in the device, such mains switches are very expensive. And where devices with a timer are concerned, complete mains isolation is often not desirable, because otherwise the timer would have to be reset each time the device is connected if no buffer storage or automatic control by input signals (radio timer, internet, teletext, radio data system) is possible.

However, in standby mode devices consume relatively large amounts of electrical energy. This is due, on the one hand, to power dissipation of the power supply unit, on the other, to the power consumption of the standby circuits used, which frequently comprise the whole of the control electronics, including microcontroller. Altogether this amounts to a residual consumption of between 1 and 10 watt.

It is an object of the invention to further reduce the power consumption of electrical devices in the power-down mode, while at the same time any desired convenience functions are retained.

This object is achieved by a standby circuit as claimed in claim 1, an electrical device as claimed in claim 15, a method as claimed in claim 22 for the control of an electrical device and a power supply assembly as claimed in claim 25 for an electrical device. Dependent claims refer to advantageous embodiments of the invention.

A standby circuit for an electrical device according to the invention has one or more signal inputs. These are electrical circuit connections, designed so that, for example, a receiver for remote control signals, an on/off switch, a useful signal (e.g. video signal or audio signal), a digital interface or some other signal transmitter can be connected to this input and the corresponding signals can be processed. It is also possible for the input to be designed so that different signal transmitters (e.g. switches, IR receivers, etc.) can be connected to the same input. Preferably the inputs are programmable as regards their evaluation (such as gain, threshold value detection, possibly signal decoding).

The standby circuit also has a control unit. This designation has been chosen for purely functional reasons in this case. It may be a logic element, which combines different inputs in a predetermined way to generate a corresponding output signal. For this purpose the use of a programmable logic element is proposed, although it could also be a hardwired circuit. Apart from pure logic operations (AND, OR, etc.), the circuits may also comprise other elements and functions, such as registers, shift registers, arithmetic operations, comparators, timers, etc. Likewise conceivable are software-based solutions, the control functions being taken over by a program running on a microcontroller. It is preferable for the control unit function to be programmable.

According to the invention the standby circuit also has a control output for the control of a power supply unit. Here the control of a power supply unit is understood to mean that a power supply unit can for example be controlled electrically, optically, electromechanically or in some other way, i.e. it can be switched to different switching states. This includes the switching on and off of the power supply unit, but can also include the switching over of the power supply unit to intermediate operating levels. The control output must be suitable for actuating such a control. In the case of electrical drive the output must be designed so that it can deliver the power necessary for the control, for example to the circuit of an optoelectronic coupler or relay. Here—for the optimization of power consumption—a pulse drive can also be provided.

When an electrical device is in its power-down mode, its standby circuit is active. The circuit should advantageously be designed so that in this operating mode it consumes as little energy as possible. The signal input or the signal inputs are—at least at periodic interrogation intervals—active and connected to the control unit. If a signal representing an activation event is applied to one of the signal inputs, the control unit initiates the activation procedure. Activation events include the actuation of the switch in the case of a switch input, the occurrence of a useful signal in the case of a useful signal input (such as the application of a video signal to the A/V input of a television, detected, in the simplest case, by a comparator) or a command sequence of remote control signals, which are intended to switch the device on, in the case of a remote control input. Serving as another example of an activation event defined by a useful signal is the VPS signal in the case of a video recorder. However, since pure threshold value detection does not suffice for this purpose, a correspondingly complex decoding circuit (receive circuit) is required. For optimization of the power consumption this can, for example, be activated just before the programmed recording time.

The activation procedure can vary in this regard according to activation event. In the simplest case the control unit activates the control output and consequently switches the power supply unit on so that the device switches over to the power-up mode.

The remote control input can have a special part to play in this regard. While the consequence of an "on" switch signal or the occurrence of a useful signal, for example, is simply that the device is switched on, the situation with remote control signals is more complicated. On the one hand in this case the signal and the necessary processing alone are significantly more complex. In the case of radio or infrared remote control signals, for example, the signals in question may require amplification, demodulation, filtering and for processing preferably digitization. On the other, the simple presence of a signal need not represent an activation event. But it can be necessary first to establish whether a remote control signal is actually intended for the device (and not for some other device). In addition, verification is required as to whether the remote control signals received are actually intended to activate the device. Finally, the reaction of the device desired by the user and initiated by the remote control signal is also not always the same. But a user can, for example, start a television immediately with a preselected program (receive channel) by pressing the appropriate number button.

When it comes to the processing of remote control signals by the standby circuit, essentially the options of full analysis, minimal analysis and multistage analysis are proposed, a decision being required according to the application about which form of analysis of the remote control signals is meaningful in each case.

With a complete analysis the remote control signals received are analyzed completely by the standby circuit, i.e. the codes represented by the remote control signal are determined and compared with stored standby signals, i.e. command sequences that are intended to initiate an activation event. Such standby signals can be prestored in the standby circuit. But it is preferable for the signals that are intended to represent an activation event to be freely programmable i.e. storable in the standby circuit.

With a minimal analysis an activation event is defined in the standby circuit by any activity at all being detected at the remote control input (e.g. infrared detector diode, ultrasonic or radio receiver, etc.). In the case of an infrared remote control this is even possible in a photovoltaic operating mode of the infrared diode. As soon as any form of infrared signal occurs, an activation event is initiated, by which the electrical device is switched to an operating mode in which the device control unit (microcontroller) is activated, which then fully decodes the signal.

With a multistage analysis the standby circuit starts by establishing whether there is any activity at all at the remote control receive element (e.g. infrared input). If this is the case, then the standby circuit moves on to initiate a full analysis. This has the advantage that full functionality (with little time lag) is possible with very low power consumption. Unnecessary activation events (if, for example, none of the preset standby codes has been received) can consequently be avoided.

Provision can be made for the command sequences received, which have initiated the activation event, to first be stored temporarily in the standby circuit, from here to be read out by the then "awakening" microcontroller of the device, so that the signals transmitted do not become "lost" but are executed. Especially preferred is that even when the device is in its power-up mode the remote control signals first make their way to the standby circuit to be read out by the control unit of the device. In this way there is no need for a second remote control signal receiver.

In a further aspect of the invention a digital data input is provided as an additional signal transmitter input. It can be connected to any digital interface, including standardized serial or parallel interfaces, bus systems, etc. In particular a computer interface, e.g. an Ethernet network, can also be monitored for defined activation events. This is especially useful for connection to the internet.

The standby circuit preferably contains a memory, which can, for example, be implemented as static RAM. With this type of memory, stored data are retained, only extremely low power being required for this purpose. The size of the memory is to be designed so that it is adequate for the storage of operating parameters (switching behavior, sensitivity of the analog input, etc.), received remote control codes, stored standby codes and clock or time switch clock registers.

In a further aspect of the invention a clock is also provided in the standby circuit. This term is used here functionally for any form of timer or continuous counter, i.e. clock is also taken to mean a simple counter register with automatic incrementation. A clock generator can be provided in the standby circuit. It is preferable in this regard to place at least the clock pulse determining component (e.g. quartz) or even a complete clock generator (oscillator) externally. Inputs for the connection of a frequency-determining component and inputs for an externally generated clock pulse are designated collectively as "clock inputs". A unit that derives the clock pulse from the mains frequency can also be considered to be a clock generator.

If there is a clock available, the control unit can perform a time switch function, by which the activation procedure is initiated at a set activation time (or count). Advantageously, the standby circuit clock can serve as real-time clock of the whole device, the device control unit preferably reading out the clock on each switching on. In the counter register version the counter position can then be translated into time units (year, month, day, hour, minute, second). There is then no need for a separate real-time clock.

In a further aspect of the invention a communication connection is provided to enable the standby circuit to communicate with the device, for example with the microcontroller of the device containing the standby circuit. It can be any form of data communication known to the expert. Digital communication methods are preferred, for example, serial or parallel interfaces and also bus systems. The I²C-bus is preferred here as an especially simple standard connection between integrated circuits that can be implemented at low cost. The control unit can on the one hand be programmed by way of such a communication connection, so that activation events are defined (for example, if the control unit is supposed to initiate the activation procedure on receiving a switch signal, but not on receiving a useful signal). Direct transfers into the memory are also possible, for example of command sequences from a remote control by which the activation procedure is intended to be initiated. In the case of a communication connection that also allows the transmission of data, a remote control command sequence received on switching on and stored in the memory (and also as appropriate all other codes received after switching on) can also be read out by way of the communication connection.

State-of-the-art standby circuits have often comprised the entire control electronics of the device, i.e. there has been no dedicated standby circuit, but the control electronics—microcontroller included—have remained active in standby mode. In a further development of the invention it is now intended that a separate standby circuit be provided. It will preferably take the form of an integrated circuit, i.e. a chip.

Standard models with 8 or 14 terminals, for example, can be used for this purpose. Very low production costs and also low power consumption can be achieved as a result. Known, low current drain chip technologies, such as CMOS, are preferred.

The standby circuit is preferably designed so that as little electrical energy as possible is consumed in the power-down mode. It comprises an energy-saving circuit design (in which the power consumption is minimal at no-load, i.e. as long as no signals are applied) and preferably also intelligent power management, in which components of the circuit that are not required are disabled. Proposed as a further energy-saving measure is the monitoring of the inputs in burst mode, i.e. only periodically.

A device according to the invention can be switched to a power-down mode and an operating mode, the power supply unit being disabled in the power-down mode, but a standby circuit remaining active. Apart from the power supply unit such a device has a number of functional units. This functional term is taken to mean any unit contributing to the function of an electrical device. For example, it includes the electronics and the picture tube of a television, the tape drive and the drive electronics and also the receive element of a video recorder, etc. A functional unit is taken to mean all the electrical components of known electrical devices apart from the power supply unit, which makes possible the connection to a power supply and supplies the functional units with electrical energy.

For the standby circuit to remain active when the power supply unit is disabled, it requires a separate energy supply. This may, for example, be a simple, primary side power supply, i.e. a power supply unit that preferably has a direct connection, i.e. with no transformer, to the electricity supply system. In this way the low operating currents required can be drawn directly from the electricity supply system with a protective resistor or by way of a capacitor. Alternatively, an energy store can also be provided for supplying the standby circuit with electrical energy. Here it could be a matter of a (preferably replaceable) battery. Using semiconductor technology in use today for the standby circuit such a battery would easily supply the electrical energy required for the standby circuit for two to five years.

Especially preferred, however, is a rechargeable energy store. This could be an accumulator or a capacitor of sufficient capacitance. Depending on the model, this could be a standard (e.g. electrolyte) capacitor or a special high-capacitance capacitor with a capacitance of usually 0.047 F or more.

For rechargeable elements it is advantageous for a charging device to be provided. It can use external energy sources, such as solar cells. Usually, however, it will mainly be supplied with electrical energy by the power supply unit of the device when it is active (when the device is in its operating mode).

In this regard there are different ways of ensuring that the power supply for the standby circuit continues to be guaranteed in the event that the device remains in the power-down mode for a long time. On the one hand the energy store can be monitored, the voltage it supplies for example being compared with a minimum threshold. If the energy store drops below a minimum level, it is recharged, preferably by switching on the power supply unit, so that it makes the voltage required for charging available for a certain time (charging cycle). It is preferable in this case that on switching on the power supply unit the whole device is not put into operation, but that the functional units remain disabled and only the power supply unit is active for the supply of the charging circuit (power-up masking).

Alternatively, or in combination with this, a charging strategy can also be pursued in which the power supply unit is switched on briefly to charge the energy store at previously programmed intervals (fixed charging cycles). Such a strategy can be implemented by way of the time switch clock function provided in the standby circuit, while on the device being switched off a period of time—for example, approx. 5 minutes with a 1,000 µF capacitor as energy store or several weeks with a 100 mAh accumulator—is pre-programmed, on the expiry of which the power supply unit is switched on again. Here too it is preferable that the power supply unit alone and not the functional unit of the device be switched on.

In the case of a power supply assembly according to the invention a standby circuit is integrated with a power supply module. This power supply assembly can then be used in customary devices altogether as an "intelligent" power supply unit, the power supply unit itself having a standby function.

These and other aspects of the invention are apparent from and will be elucidated, by way of non-limiting example, with reference to the embodiment(s) described hereinafter.

Figure 1:
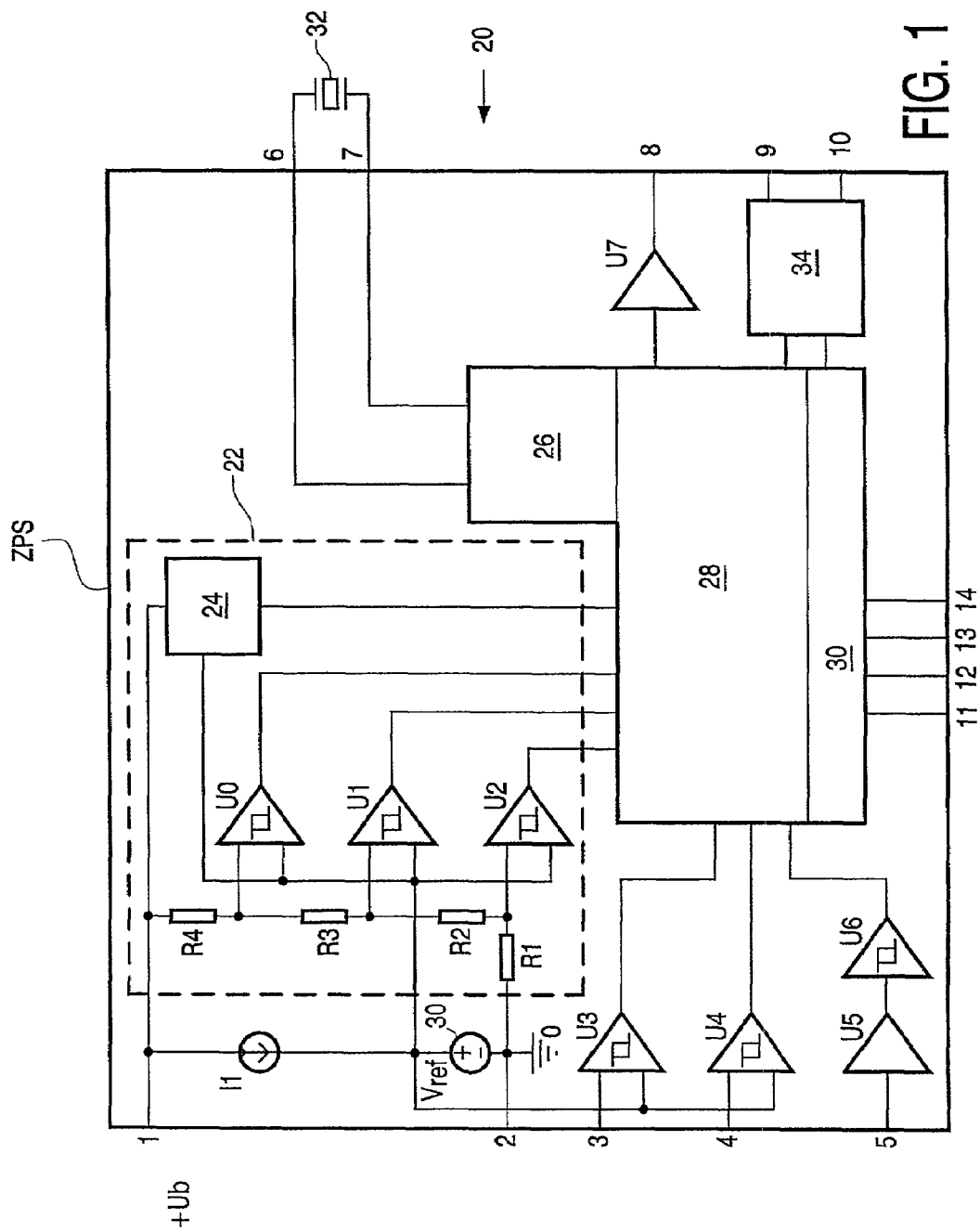
FIG. 1 shows a schematic diagram of a first embodiment of a standby circuit.

FIG. 1 shows a switching module ZPS including a standby circuit 20. The switching module ZPS has 14 external terminals 1 to 14. The standby circuit has a power supply assembly 22 with a linear voltage regulator 24. Also provided are a clock 26, a control unit 28 and a store 30.

The terminals 1 and 2 of the module ZPS are used for the power supply. The power supply assembly 22 here has a linear voltage regulator 24, to which the constant voltage Vref is fed as a reference and which holds a constant, linearly regulated supply voltage ready for the control unit 28 and (not shown), as appropriate, the other components. In this way the circuit module can be operated across a broad range of input voltages from approximately 2 to 15 V. The power supply assembly 22 has a voltage divider formed from resistors R1, R2, R3 and R4, the voltage level of each stage of the voltage divider being connected to one of three comparators U0, U1 and U2. These comparators U0, U1 and U2 compare the respectively divided fraction with the fixed reference level Vref.

The reference voltage, as shown, can for example be supplied by a power source I1 and a zener diode 30. In this way Vref remains independent of the input voltage, with constantly low power consumption.

The respective output signal of the comparators U0, U1 and U2 is fed to the control unit 28. Taken together the three digital signals provide information about the voltage level+ Ub at input 1. If, for example, the comparator signals U0 and U1 are equal to 0 (i.e. the supply voltage divided once and also twice is less than the reference voltage), but the third comparator signal U2 is still equal to 1 (i.e. the supply voltage divided three times is still greater than the reference voltage), then the information that this gives the control unit 28 in total is that the supply voltage has indeed dropped sharply, but is still above a minimum level.

The table below shows by way of example in what way the signals U0, U1 and U2 can be used together. The control unit performs the necessary action in each case as a function of the value supplied.

|  | U0 | U1 | U2 | Meaning |
|---|---|---|---|---|
| $U = U_{max} = 5\ V$ | 1 | 1 | 1 | Maximum voltage reached, in charging operation switch off power supply unit |
| $U \approx 2\ V - 5\ V$ | 1 | 1 | 0 | Normal operating range, no action required |
| $U = U_{min1} \approx 2\ V$ | 1 | 0 | 0 | Minimum operating voltage reached, switch on power supply unit to recharge energy store |
| $U = U_{min2} \approx 1.5\ V$ | 0 | 0 | 0 | Voltage loss, information and function of the chip invalid |

The switching module ZPS is structured as a conventional integrated CMOS semiconductor circuit. Care is taken in the design of the circuit to keep the power consumption as low as possible. The CMOS module ZPS proposed here as an example operates in an input voltage range from 2 to 5 V. The average power consumption of this example of the invention is less than 2 mA, especially preferred at less than 200 µA.

The inputs 6 and 7 of the switching module ZPS are clock inputs for the timer increment rate, supplied here by an oscillator, whose active electronics are integrated with the clock 26 and which is connected to an external crystal 32. The clock 26 is a 32-bit counter register, the counter register being incremented with every clock pulse (divided by a divider not shown) at the inputs 6, 7. This counter register 26 is connected to the control unit 28, so that it can be read out from there. The counter position can be transformed into year, month, day, hour, minute and second by conversion.

Output 8 of the circuit module ZPS is used to drive the power supply unit. The control unit 28 drives an output driver U7, through which a wide range of currents (1 mA to 200 mA) can be supplied from output 8 at least for a short time. To this end—depending on the use of the switching module ZPS—an optoelectronic coupler of a power supply unit, a relay or a direct SMPS control input can be used to switch a power supply unit on or off.

A bus driver component 34 is connected to the store 30 and to the control unit 28. The bus driver component 34 is driven by way of the inputs/outputs 9 and 10. The component in question is a known bus driver component for the I²C-bus. Data can be transmitted to and from the store 30 or to and from the control unit 28 by way of the I²C-bus according to the protocol for this, which is known to the expert.

The switching module ZPS has the signal inputs 3, 4 and 5. Input 3 here is a switch input. An on/off switch can be connected directly to this input. On actuation of the switch the voltage pulse released by it is compared to the reference voltage Vref by a comparator U3. The comparison result is fed to the control unit 28. Awhile in an alternative embodiment of the invention a bistable flip-flop is connected downstream of the switch, in the present embodiment of the invention this function is taken over directly by the control unit 28.

Input 4 is a useful signal input for the useful signal of the electrical device in which the circuit module ZPS is used. For a television this can for example be the SCART (A/V) input, for a computer monitor the VGA (sync) signal, for an audio amplifier a music signal, with a video recorder a SCART signal, for telecommunication devices a signal that indicates a call and for computer peripherals a signal on the respective bus connection. This signal is amplified and compared with the voltage Vref by the comparator U4, the control unit 28 again evaluating the comparison result.

Input 5 is a remote control input, which is designed for the direct connection of an infrared detector diode or an infrared detector module. An infrared detector diode supplies a very low level analog signal, which is amplified by an amplifier U5 (with automatic gain control) and band-pass filtered by a filter (not shown). The A/D converter U6 then converts the signal into a digital signal, which is processed by the control unit 28.

Infrared detector modules supply a digital signal directly, so U5 and U6 are not required in this case.

The signal at output 5 is fed to the control unit 28. It is in a position to decode the digital infrared signals received, i.e. to allocate command sequences. In this case the sequences stored in the store 30 are intended to initiate the activation procedure. The control unit 28 compares the sequences received with the sequences stored in the store 30. Where the sequences sufficiently match the activation procedure is initiated (see below). In the process these and other incoming command sequences are filed in the store 30 by the control unit 28, so that they can subsequently—once the microcontroller of the device has "woken up"—be retrieved by way of the I²C-bus.

The switching module ZPS also has the inputs 11 to 14, which are provided as programming pins. With the appropriate wiring of the pins, various . . . can be driven. This can be provided as an alternative to the I²C-bus at inputs 9 and 10. In this way the circuit module ZPS can for example be programmed with pin jumpers for specific operating modes. Altogether 16 different binary combinations are selectable at the four programming pins 11 to 14, in the version as tristate input 81 combinations are possible.

Examples of such programming (i.e. selection of modes) are shown below in the form of a table:

| 0. | 0000 | Standard mode, programming with I²C interface |
|---|---|---|
| 1. | 0001 | Standard TV, activation procedure in case of switch IR code for television sets |
| ... | | |
| 10. | 1010 | Computer monitor, activation procedure in case of switch or signal at analog input |
| 11. | 1011 | ... |

The same switching module ZPS can therefore be installed in different devices, the programming pins 11-14 being set as appropriate depending on the device (e.g. 1010 for installation in a computer monitor).

The control unit 28 suitably combines the different signals fed to it in order to activate output 8 in the event of a defined activation event. The control unit 28 is a programmable logic element. In an alternative version (not shown) the control unit is a simple microcontroller, which uses the oscillator of the clock as a clock pulse. The programming here takes place by way of the I²C interface 34. Depending on its programming the control unit 28 can perform the following functions:

initiation of an activation event in the event of a corresponding output signal from the elements U3, U4 or U6 (signal inputs)

initiation of an activation event where the value for the clock 26 matches an activation time stored in the store 30 (time switch function)

initiation of an activation event in the event of a digital value supplied by the comparators U0, U1 and U2, which indicates the near exhaustion of the energy supply (charging cycle).

In the process the control unit 28 operates an intelligent power management, by which components of the standby circuit ZPS that are not required in a particular operating mode or in corresponding programming are switched off. This affects the output driver U7 for example, the electronics downstream of the inputs 3, 4 and 5 or the I²C interface 34.

In an alternative version each interrogation of the inputs 3, 4 and 5 takes place in burst mode at preset intervals. These intervals depend on the type of input. A switch should be interrogated every 10-500 ms, in the case of a useful signal input interrogation intervals of up to 5 s are possible without distinct convenience losses. Preferred are interrogations every 100 ms for a switch and 1 s in the case of a useful signal input. In this way there is no need for the elements in question, which, like for example the amplifier U5, contribute significantly to the overall energy consumption, to be switched on all the time; instead they are periodically activated for just a short time.

Figure 2:
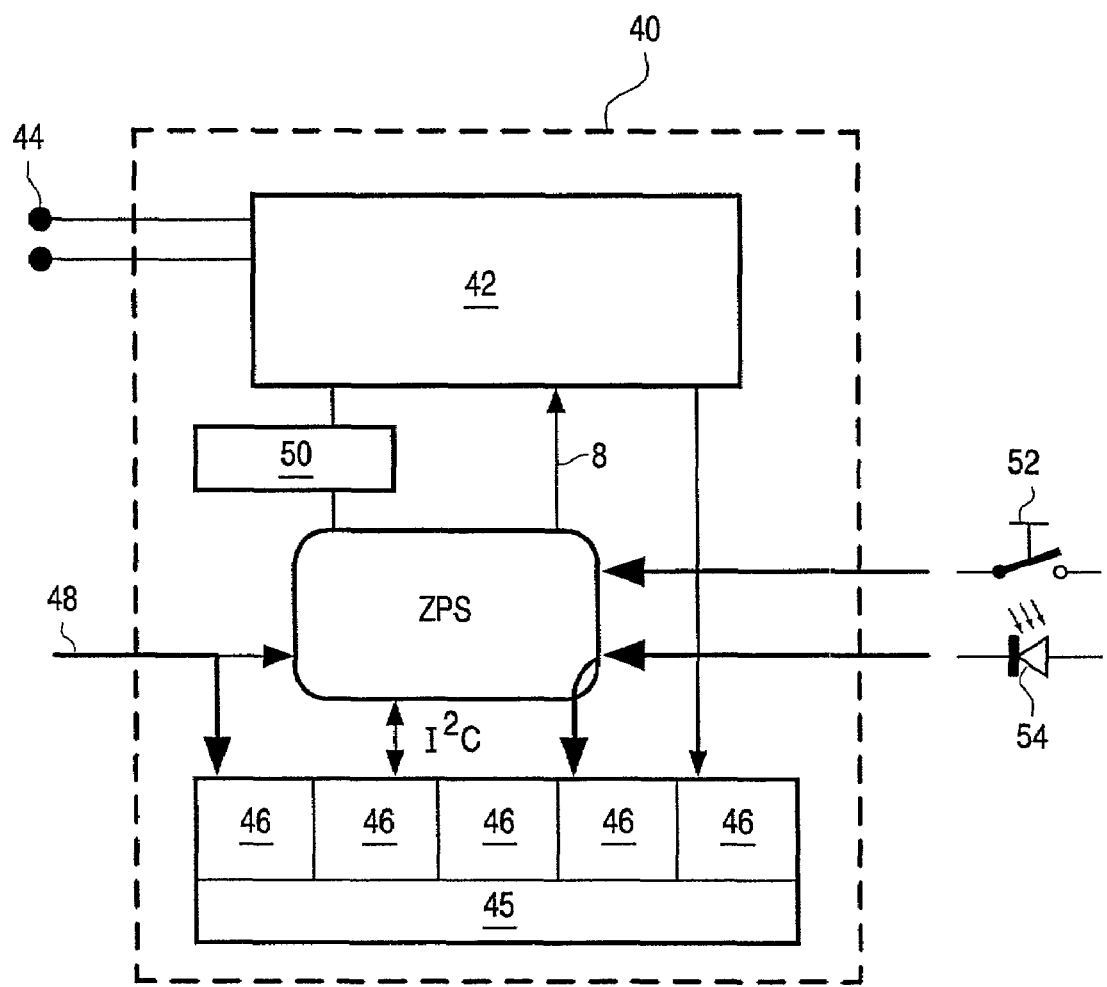
FIG. 2 shows a block diagram of the components of an electrical device including a standby circuit.

FIG. 2 shows a block diagram of an electrical device 40. This device may for example be a television, a video recorder or some other electrical device. The device 40 has a power supply unit 42 for the power supply, which is connected to the electricity supply system with terminals 44. The device 40 also has a device control unit 45 (for example the microcontroller control of a television) and functional units 46 (in the case of a television for example the picture tube and the receiver element). The functional units 46 and the device control unit are supplied with electrical energy by the power supply unit 42. A useful signal (e.g. a video signal at the SCART input in the case of a television) makes its way to the functional units 46 by way of a useful signal input 48.

The device 40 is equipped with a switching module ZPS. This is a separate circuit. The switching module is supplied with electrical energy by an energy buffer element 50. It can switch the power supply unit 42 on and off by way of the output 8.

The electrical device 40 has an on/off switch 52 and an infrared detector diode 54 as examples of external input elements. They are connected to the signal inputs of the switching module ZPS. The switching module ZPS has a communication connection to the functional units 46 of the device by way of an I²C-bus.

The electrical device 40 can be switched between a power-up mode and a power-down mode. In the power-up mode the power supply unit 42 is switched on and supplies the functional units 46 and the device control unit 45 with electrical energy. At the same time the buffer element 50 is supplied with electrical energy, so that this energy store charges itself. In the power-up mode of the device 40 the functional units 46 are active. In the case of a television, for example, both the picture tube and the receiver element are switched on. A useful signal (e.g. aerial signal) 48 is fed to the functional units 46 where it is processed accordingly (e.g. recognized, demodulated, displayed, recorded, etc.). In the power-up mode the device 40 can be controlled remotely by way of an infrared remote control (not shown). The signals from the infrared remote control are detected by the infrared detector diode 54 and routed by way of the appropriate signal input to the switching module ZPS, which forwards the corresponding signals by the I²C-bus to the functional unit 46 provided for it. As an alternative a separate receiver for remote control signals can also be provided for the functional units 46, so that the signals do not have to be routed by the switching module ZPS.

The device 40 can be switched from the power-up mode to a power-down mode. This can be effected by an appropriate external command input (e.g. actuation of the "off" switch 52 or corresponding remote control command). The power-down process can, however, also be effected by the device control unit 45, for example if the useful signal 48 fails for a predetermined period of time.

On deactivation the device control unit 45 programs the switching module ZPS so that the desired activation events are defined. For instance, some future activation time at which the switching module ZPS is to initiate the activation procedure in the manner of a time switch can be transmitted to the switching module ZPS. Likewise defined with regard to the signal inputs of the switching module ZPS are the events at the signal inputs that are to be activation events. With regard to the remote control signals such command sequences are transmitted to the switching module ZPS that are intended to effect an activation. Then the power supply unit 42 will be switched off (directly by the device control unit 45 or by the switching module ZPS following a corresponding command via the I²C communication link). The electrical device 40 is now in the power-down mode, in which only the switching module ZPS fed by the buffer element 50 is still active. The functional units 46 and the device control unit 45 are completely switched off, no further power is supplied by the power supply unit 42. No further electric power is drawn—ideally even by the power supply unit—from the electric mains 44. As we shall explain in more detail below, residual losses can still occur even when switched power supply units are switched off.

The switching module ZPS now monitors the signal inputs and the clock for possible activation events during the power-down mode. Activation events here include the following:

actuation of the "on" switch 52 occurrence of a useful signal 48 detection of a remote control command sequence that sufficiently matches the stored "wake-up" sequences arrival of the activation time (matching of the preset time with the state of the internal clock)

the supply voltage at the buffer element 50 dropping below a defined minimum value.

Depending on the application, in particular depending on the type of electrical device 40 under consideration, only a few or even just one of the aforementioned functions can have an effect here. For other applications additional activation events can be defined as required and for them additional inputs can be provided.

If the switching module ZPS detects an activation event in the power-down mode, then it drives the power supply unit 42 by way of output 8 so that it is powered up again. As a result, the electrical device 40 is switched to the power-up mode, in which the functional units 46 and the device control unit 45 are supplied with power by the power supply unit 42. At the same time the buffer element 50 is again charged with energy.

In the event that the activation procedure is only initiated to recharge the buffer element 50, appropriate power-up masking can be used, so that the functional unit 46 and the device control unit 45 are not powered up, but the power supply unit 42 simply supplies the buffer element 50 with energy until it is sufficiently charged again. Such charging cycles can either be time-controlled (whereby on deactivation a period of time is predetermined after which a further charging cycle is to take place) or the voltage supplied by the buffer element 50 can be monitored, so that a charging cycle is activated in good time before exhaustion of the buffer element 50. The power supply assembly 22 elucidated in connection with the standby circuit ZPS supplies an appropriate signal that can be evaluated for this purpose.

If the activation procedure is initiated on the basis of a received remote control command sequence, then after the start delay the "awakening" device control unit 45 reads out the remote control commands received and temporarily stored in the switching module ZPS and then processes them. This ensures that the signals that first initiated the activation are also executed by the device switched to the power-up mode.

Figure 3:
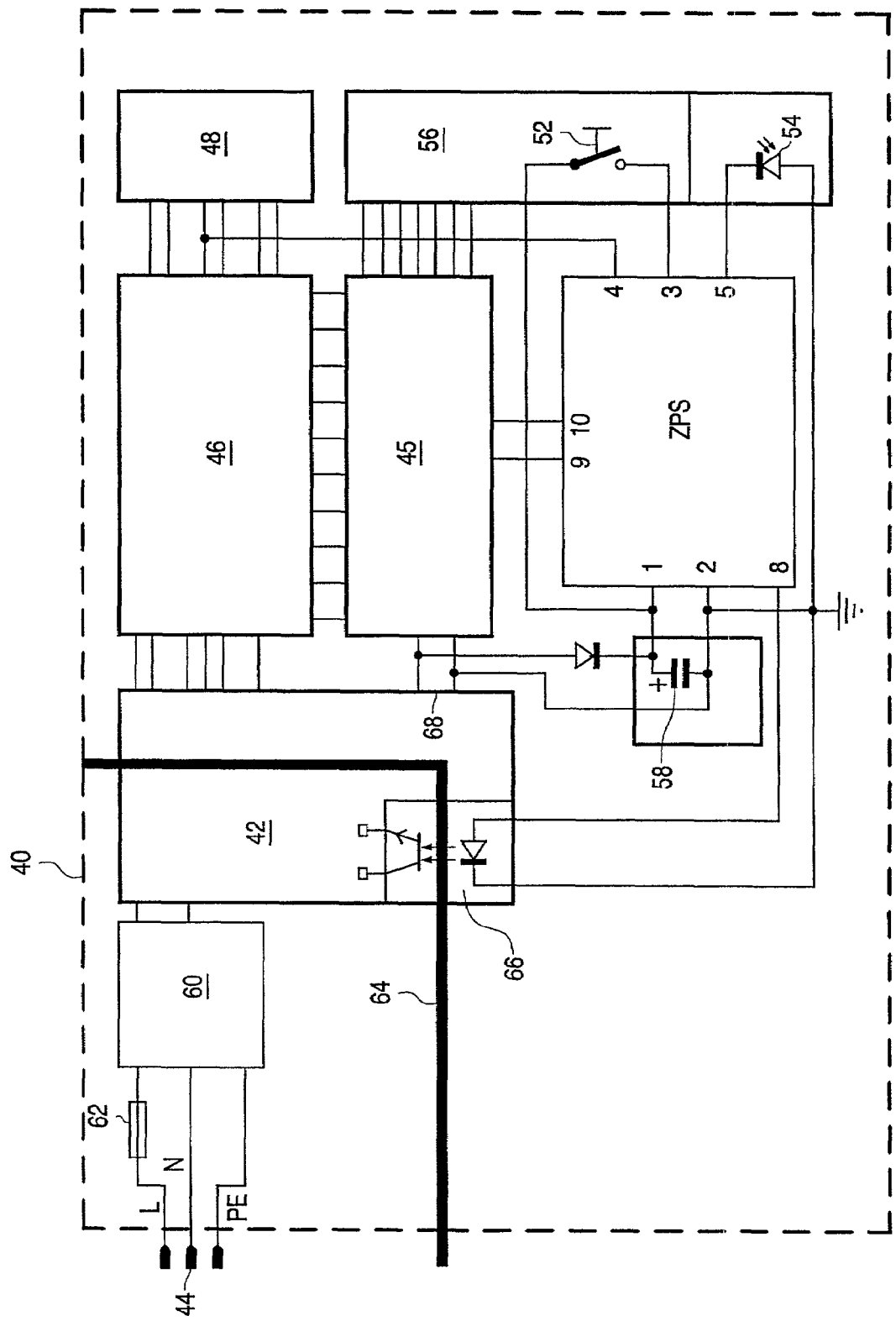
FIG. 3 shows a schematic diagram of a first embodiment of an electrical device including a standby circuit.

FIG. 3 shows a first embodiment of an electrical device with a standby circuit in a schematic diagram. This embodiment is particularly suitable for light duty power supply units (up to approx. 25 W). The electrical device 40 again has functional units 46 and a device control unit 45 with a microcontroller. On the front 56 of the device are a switch 52 and an infrared detector diode 54. A useful signal input 48 is connected to the functional units 46 and the switching module ZPS. A 1,000 µF electrolyte capacitor 58 serves as an energy buffer element. The electrical device 40 has an SMPS power supply unit 42 (switched-mode power supply). On the primary side it is connected to the electricity supply system by way of a mains filter 60 and a fuse 62. The primary and secondary sides of the power supply unit 42 are adequately separated according to the norm. The corresponding insulation is shown by the thick line 64. The SMPS power supply unit 42 can be switched on and off an optoelectronic coupler 66. Adequate insulation is guaranteed here by the optical coupling.

The LED of the optoelectronic coupler 66 is connected to output 8 of the switching module ZPS. It is by this means that the switching module ZPS switches the power supply unit on and off. Switched-mode power supplies frequently have integrated components by which the operation of the power supply unit (generation of an internal alternating voltage) is controlled. Some of these components available today have a connection for an electronic switch. In others such a switch can be added at little cost. Here the switch ensures that the controlled semiconductor switches which generate the internal high frequency A.C. voltage from the input voltage remain switched off. Here, however, the input stage is live even with the power supply unit switched off, so that a residual consumption—albeit low—remains.

On the secondary side the power supply unit 42 feeds the functional units 46 of the device 40. A secondary output 68 of the power supply unit 42 feeds the device control unit 45 with a microcontroller contained therein. If the power supply unit 42 is switched on, the capacitor buffer element 58, which serves as a power supply for the switching module ZPS, is also charged—by way of a diode—via this output. The circuit module ZPS is connected to the device control unit 45 by way of outputs 9 and 10 ($I^2C$-bus). The behavior of the switching module ZPS can be programmed by the device control unit 45 and signals—such as remote control codes from input 5—can also be transmitted to the device control unit 45 by this connection.

In this first embodiment of the invention the buffer element takes the form of a standard capacitor. With a capacitance of 1,000 µF the capacitor can guarantee the necessary supply voltage for the switching module ZPS of 2 to 5 V at a current of 10 µA for around five minutes. Recharging, however, is very fast. The capacitor can be fully charged in less than a second. In this first embodiment of the invention provision is therefore made for control of the recharging cycle by the monitoring of the supply voltage. The power supply unit 42 can be switched on by the optoelectronic coupler 66 with no disturbing noise. The rest of the power supply unit is likewise designed, so that the switching-on process does not generate any clearly perceptible or at least any disturbing noises, so that the periodic charging cycles are not unpleasantly conspicuous. In such a charging cycle, initiated by detection by the power supply assembly of the input voltage falling below a threshold, the switching module ZPS activates the power supply unit 42, so that the buffer element 58 is charged by way of the terminal 68. At the same time a signal or a command, which activates power-up masking, is sent to the device control unit 45 via the terminals 9 and 10, so that during this short-time activation of the power supply unit 42 the device control unit 45 is not completely powered up and the functional unit 46 not at all. Assuming a consumption of 5 W for five-minute charging cycles of one second each, the average power consumption in the power-down mode altogether amounts to 0.017 W.

Alternatively, a solution can also be chosen for power-up masking by which switching on the power supply unit does not automatically lead to the device control unit 45 (and the functional unit 46) being powered up, a special "activation command" first being needed for this purpose, e.g. by way of communication terminals 9, 10.

Alternatively, a high-capacitance capacitor (Super Cap, Gold Cap) with a capacitance of, for instance, 0.1 F with a maximum voltage of 5.5 V, can also be used. If the circuit module ZPS requires a current of 10 µA at a voltage of 2 to 5 V, a charging cycle is necessary roughly every eight hours. Using a slightly larger power supply unit with a consumption of 10 W and a charging time of 10 s gives us an average power consumption of 0.034 W.

In a specific application the decision about which of said elements is used as energy buffer element and which of the known charging strategies is used will be made according to the type of electrical device (and according to the type of power supply unit). All the buffer element types mentioned here can also be used in combination. As an alternative solution a power supply can also be provided using a solar cell buffered with a Super Cap. Here too, however, charging cycles are necessary if the function of the device is to be guaranteed in a dark environment as well.

Figure 4:
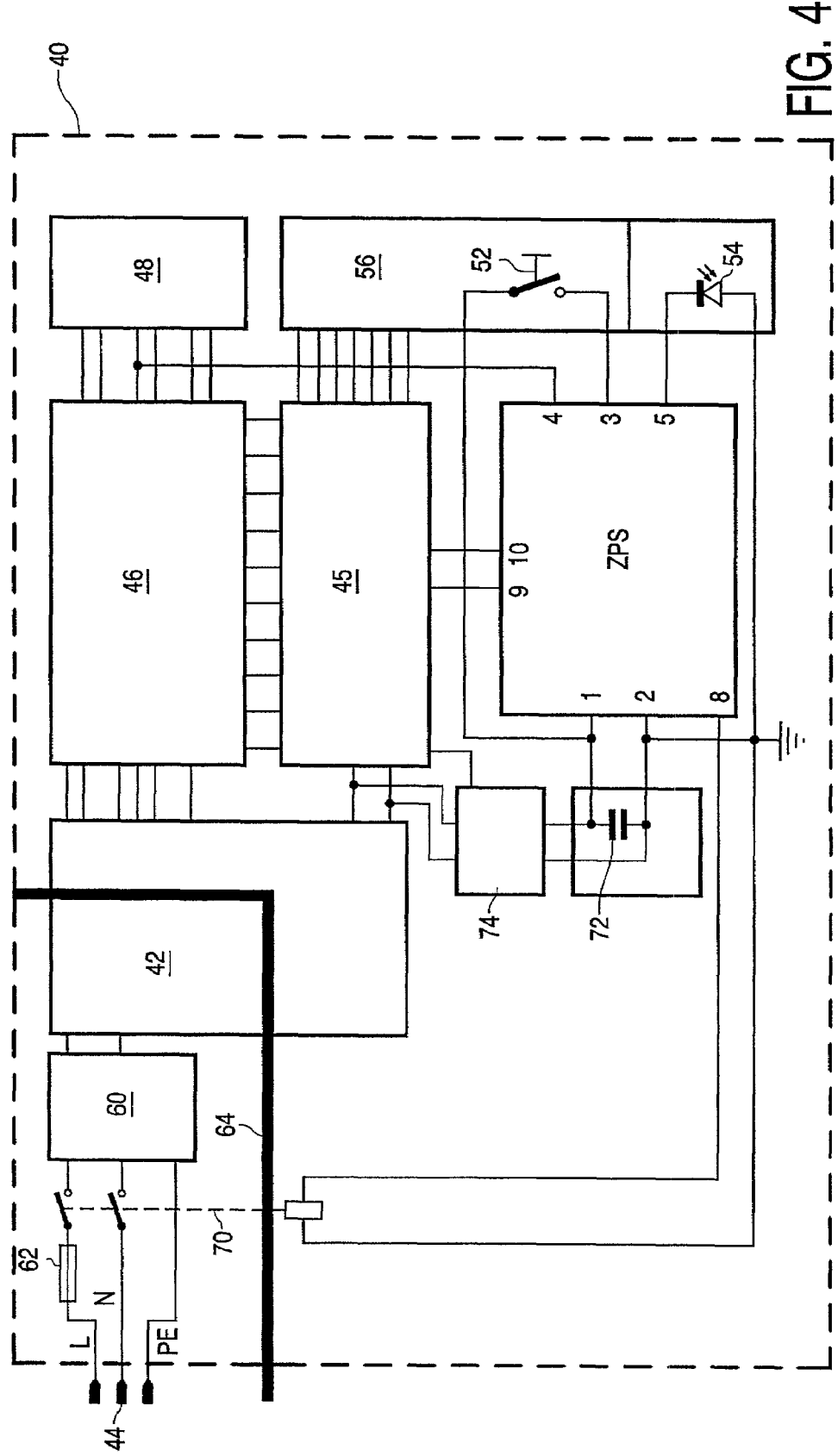
FIG. 4 shows a schematic diagram of a second embodiment of an electrical device including a standby circuit.

FIG. 4 shows an alternative embodiment of an electrical device 40. As far as most of the components are concerned, it corresponds to the first embodiment of the invention, so that what has been said above applies here too. The difference from the first embodiment of the invention is that the power supply unit 42 is not switched on or off by the switching module ZPS by an optoelectronic coupler. Instead a bistable relay 70, which is driven by the switching module ZPS by output 8 and disconnects the supply voltage from the power supply unit 42, is provided immediately behind the mains supply 44. In this embodiment of the invention the power supply unit 42 can therefore be of very simple structure and does not need to be controllable. In this case it can be a simple 50 Hz transformer, if necessary with downstream electronics for rectifying and smoothing of the supply voltage. This embodiment of the invention is also suitable for heavy duty switched power supplies (>100 W). As previously explained, a residual consumption in the input stage (filter, etc.) remains when a switched-mode power supply has been "disconnected". In the case of a heavy duty power supply unit these losses can be so great that in this case the decision will be made for complete separation from the power supply network, here by a relay 70.

A further difference from the first embodiment of the invention can be found in the nature of the buffer element. Here an accumulator 72 is provided, which is charged by a charging circuit 74. This additional difference compared with the first embodiment of the invention is independent of the control of the power supply unit 42 by the relay 70 or the optoelectronic coupler 66. The embodiments of the invention also serve here only as examples for corresponding possible combinations, a decision being required in a specific application as to which type of power supply unit control and which type of energy supply will be chosen for the switching module ZPS.

The accumulator 72 used in the second embodiment of the invention has a sufficiently large capacitance that a quiescent operation of distinctly longer than a day is possible. A capacitance of 100 mAh is preferred. In this way six weeks' operation with a power consumption of 100 µA is guaranteed. The charging time for such an element is very long, however, and comes to around five hours. Alternatively, fast charging in less than an hour is also possible, but this involves additional circuit complexity. Because of the very long cycle time of six weeks, however, it can usually be guaranteed that the charging process occurring in normal operation of the electrical device 40 is sufficient.

Should the device nevertheless remain in the power-down mode for a very long time, in this embodiment of the invention a time control looks after the charging cycles with a view to guaranteeing the supply voltage. On every deactivation the switching module ZPS is programmed by the microcontroller of the device control unit 45 so that after an operating time that can be guaranteed with certainty (e.g. five weeks) a charging cycle is initiated time controlled if the device has not been activated in the meantime.

Figure 5:
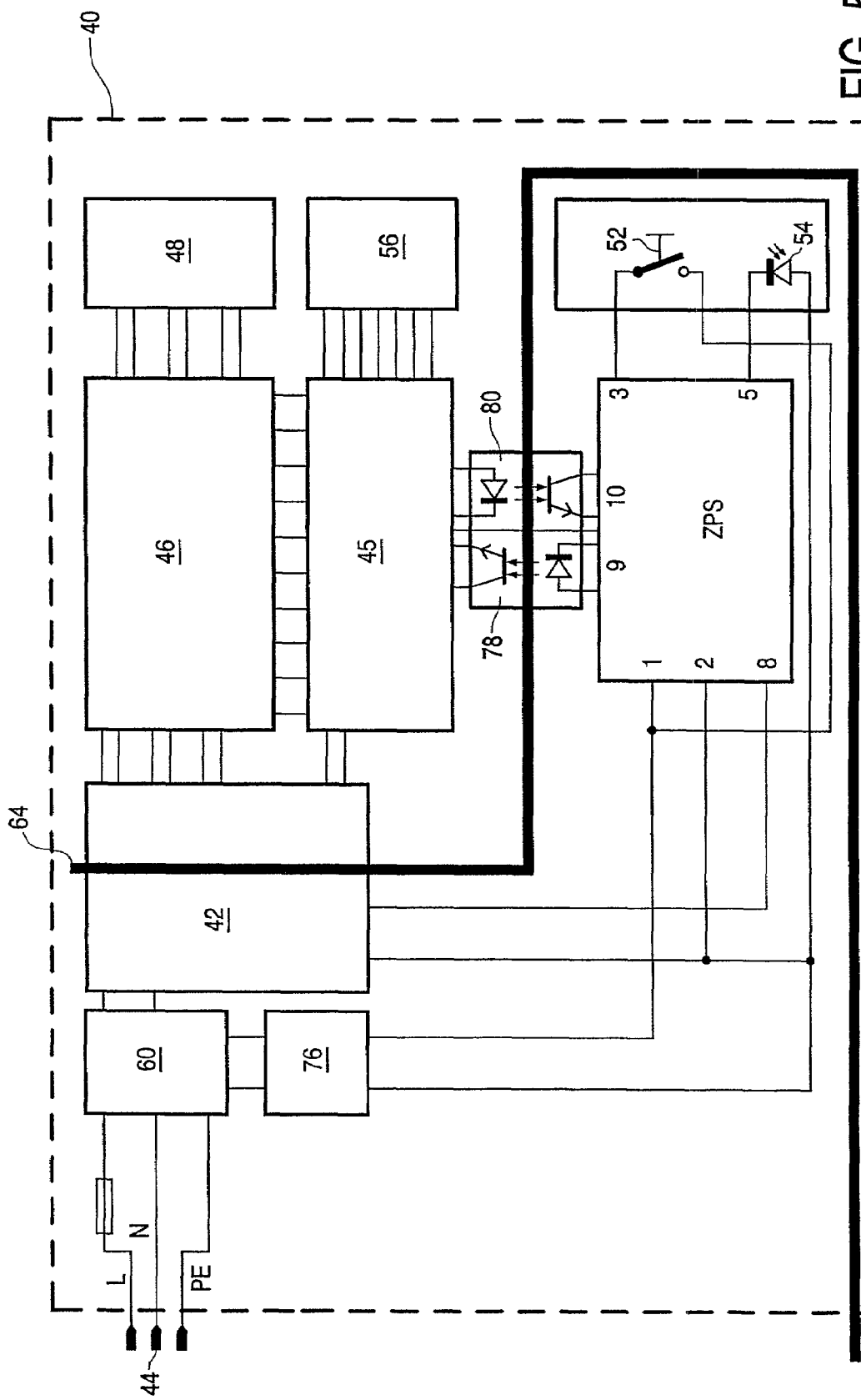
FIG. 5 shows a schematic diagram of a third embodiment of an electrical device including a standby circuit.

FIG. 5 shows a third embodiment of an electrical device 40. In contrast to the first two embodiments of the invention, no buffer element is provided here for the power supply of the switching module ZPS, but the switching module ZPS is supplied with electrical energy direct from the electricity supply system by a power supply circuit 76. The power supply circuit 76 is connected to the mains filter 60. It contains a protective resistor in the MΩ range and a rectifier circuit. Setting an energy consumption of <0.05 W as a target, up to around 50 µA can be drawn with such a protective resistor in a design for worldwide operation (worldwide mains, 85 V to 240 V). If the circuit is designed for a more tightly specified power supply network (e.g. 200 V to 240 V), higher currents in excess of 100 µA can be drawn. Even higher currents in the range of a few mA can be drawn if a capacitor is used instead of the resistor.

In the third embodiment of the invention shown in FIG. 5 the switching module ZPS is not sufficiently insulated from the primary side according to the norm, as is clear from the path of the line 64 showing the insulation. To continue guaranteeing the insulation required according to the norm, terminals 9 and 10 must therefore be connected to the device control unit 45 using optoelectronic couplers 78, 80.

In an alternative embodiment of the invention, which is not shown separately, the optoelectronic couplers 78 and 80 in FIG. 5 are omitted. Here there is no communication between the device control unit 45 and the switching module ZPS. The switching module ZPS is permanently programmed—e.g. by way of the aforementioned programming pins—to particular functions. In such an embodiment of the invention this is a very rigid solution which can in particular however offer cost benefits in that hardly any interventions on or modifications of the electrical device 40 are necessary. The standby circuit ZPS is therefore very easy to integrate with existing device designs.

Figure 6:
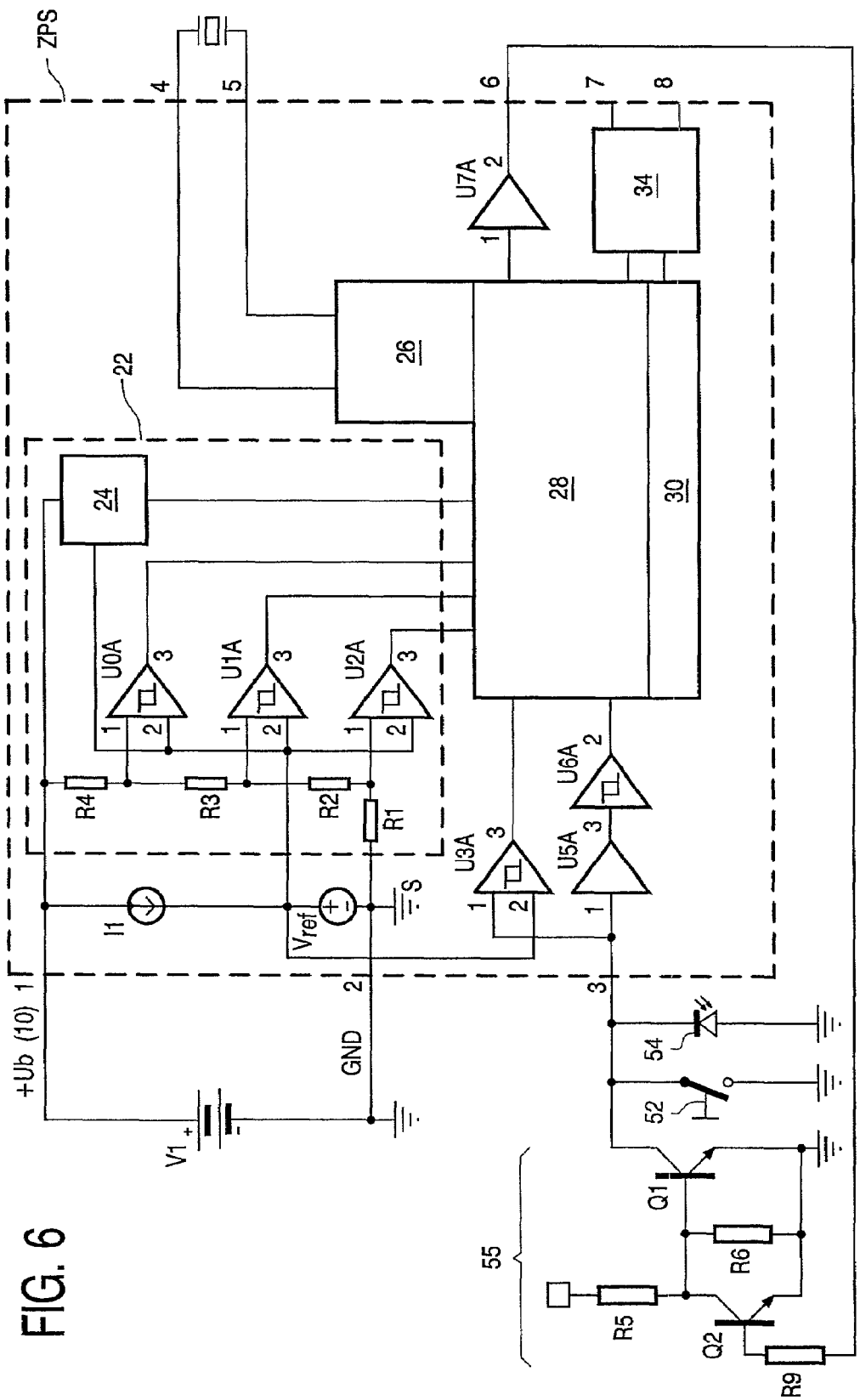
FIG. 6 shows a schematic diagram of a second embodiment of a standby circuit.

FIG. 6 shows a second embodiment of a circuit module ZPS. This embodiment of the invention has just eight terminals, so that it can be accommodated as an integrated CMOS circuit in a standard dual in line package with eight terminals.

In contrast to the first embodiment of the invention shown in FIG. 1, the second embodiment of the switching module ZPS has just one signal input 3. This signal input 3 can, as shown in FIG. 6, be used as an all-purpose input for analog signals, remote control signals and switch signals. In this case an infrared detector diode 54, a switch 52 and an analog input circuit 55 are connected to earth parallel to one another at input 3. Internally, behind input 3, both means of evaluation for remote control signals are provided with the components U5A and U8A and a means of evaluation for a switch signal with the comparator U3A. The amplifier U5A amplifies the signal from the IR diode (54) and supplies it with a low quiescent current (which produces a high-resistance connection after +Ub). The design of this quiescent current in this case has been chosen so that the voltage when the switch is open remains above the switching threshold of U3A. This may require an automatic quiescent current setting. If the switch (52) is actuated, the voltage drops to 0 V, so that the comparator U3A changes state. Because of the consequently different signals on receipt of remote control commands by the infrared diode 54, on the one hand, and on the actuation of the switch 52, on the other, the control unit 28 can recognize to which category a signal at input 3 is to be allocated.

The circuit 55 makes the connection possible of other signals to a terminal 53, in so doing merely performing rough monitoring as to whether or not a signal is present. The signal drives the transistor Q1 which, similarly to the switch, switches input 3 to 0 V via R5. The problem that arises here is that when the device is in operation, an input signal will always be applied to terminal 53, so that input 3 is constantly connected to earth by circuit 55. Then no other inputs—switch, remote control signals, etc.—can be recognized. In order for the device to be able to recognize commands after powering up, the circuit is deactivated with Q2 and R9 in the event of a signal at 6. For the purpose of this embodiment of the invention it is assumed in the driving of the power supply unit by output 6 that there is a constant output signal at output 6 as long as the power supply unit is switched on. This output signal switches on Q2, as a result of which the signal S3 at Q1 is short-circuited, so that the circuit 55 is deactivated in operation. Should a burst drive of the power supply unit be desirable, the deactivation can be effected by a separate output or some additional discrete components.

Figure 7:
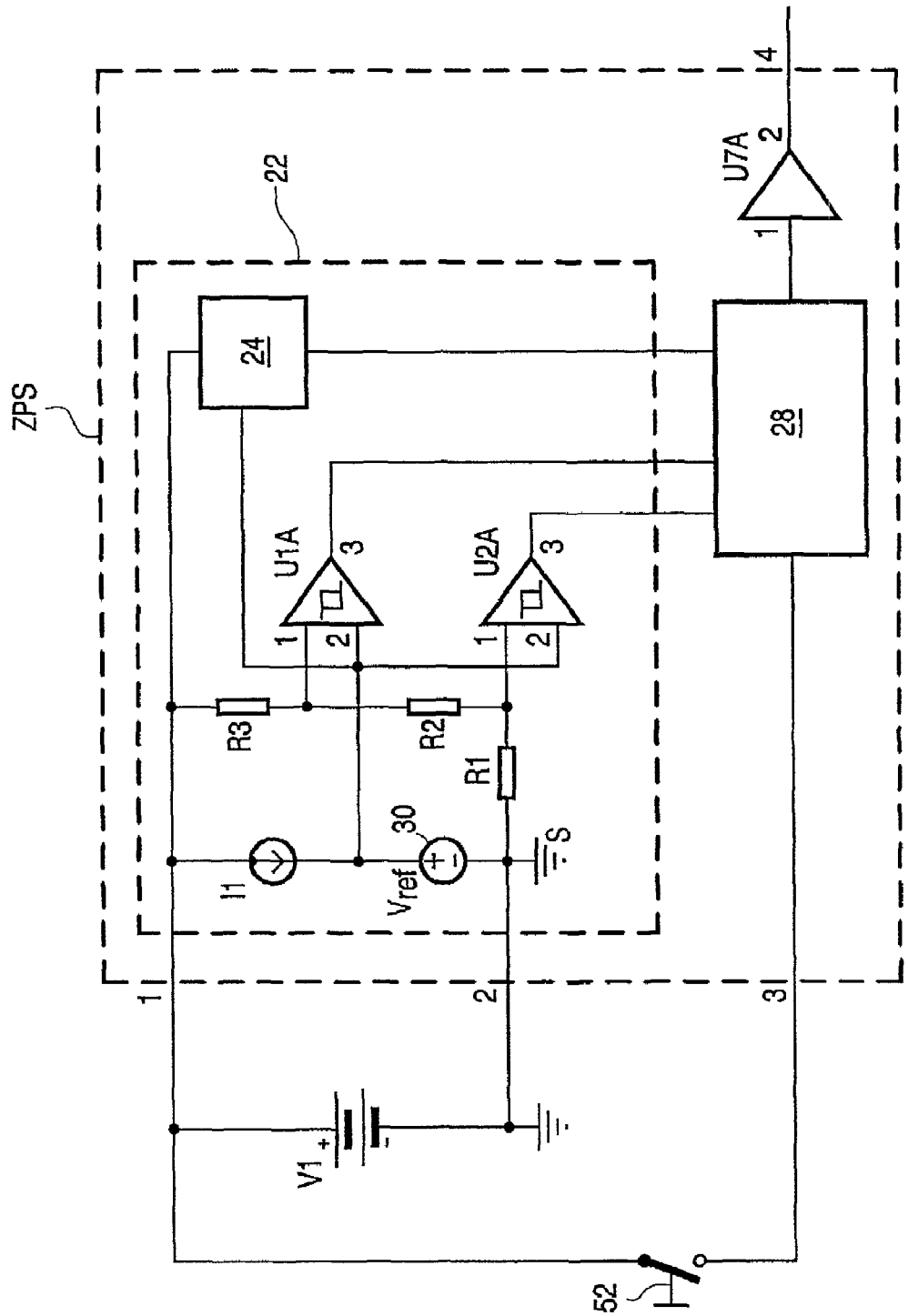
FIG. 7 shows a schematic diagram of a third embodiment of a standby circuit.

FIG. 7 shows a very simple use of a switching module ZPS. In this case the switching module ZPS serves to replace the switched-mode power supply previously frequently used in electrical devices, which mechanically disconnects the power supply unit from the power supply. This relatively expensive circuit can be effected by the combination of a switch 52, which is connected to the switching module ZPS, and a power supply controlled as shown in FIGS. 3 and 4.

The switching module ZPS in this simple form contains only a power supply assembly 22 with just two comparators, a control unit 28 and a driver U7A for the driving of the power supply (not shown). A replaceable (AlkMn) battery V1 is provided as a buffer element. With it the circuit can be operated for up to seven years. A data connection with the electronic device is not provided in this case and is also unnecessary. Such a minimal solution can be used in known devices without or with only minimal modifications.

Figure 8:
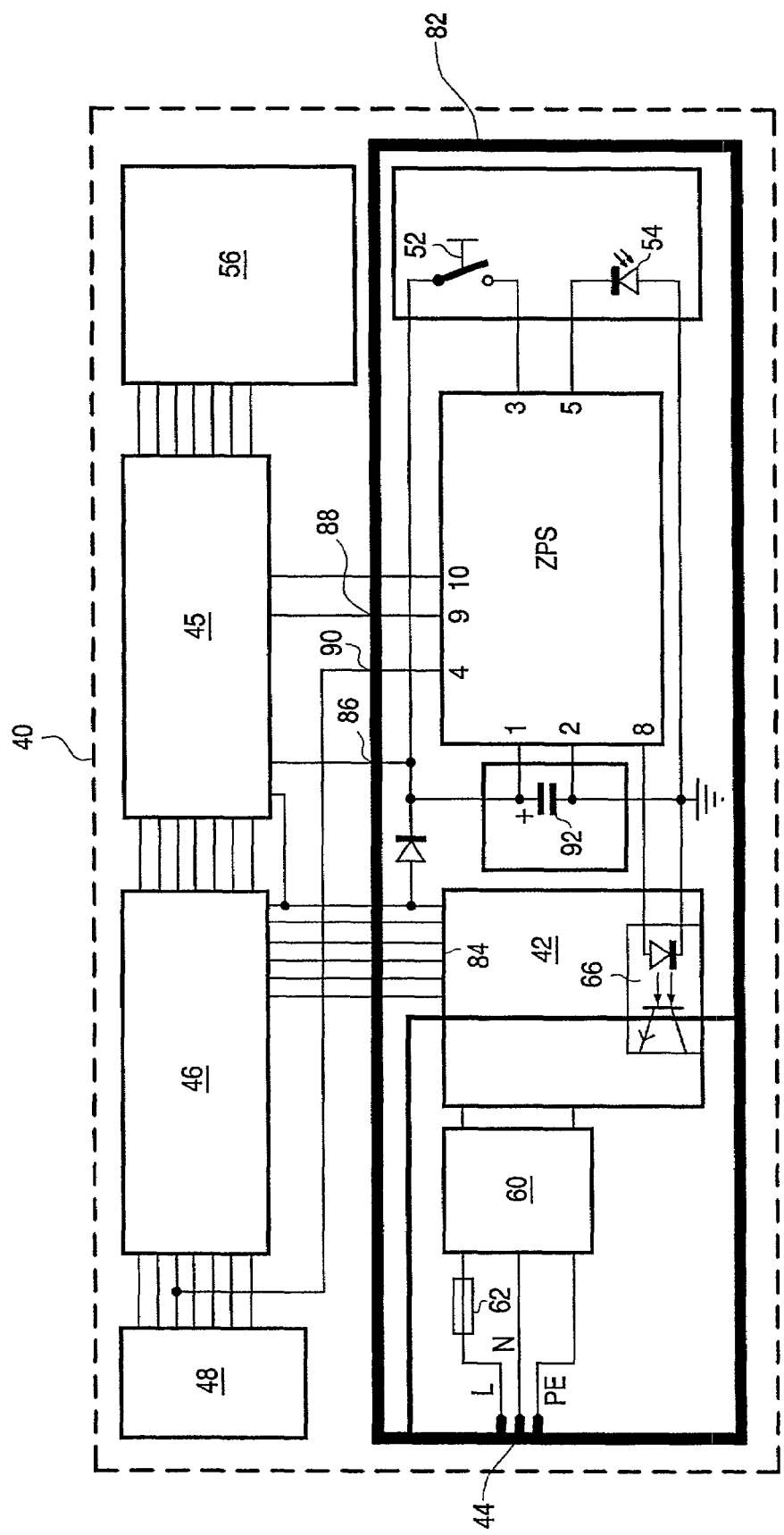
FIG. 8 shows a schematic diagram of a fourth embodiment of an electrical device including a power supply assembly.

FIG. 8 shows a fourth embodiment of an electrical device 40. The device 40 with its functional units 46, the input 48, the device control unit 45 and the front 56 with the controls located thereon is constructed as shown in FIGS. 1 to 4. In contrast to them the device 40, however, contains a power supply assembly 82, in which the functionalities of a power supply unit and a switching module ZPS are integrated together. The power supply assembly 82 has the power supply outputs 84 for the functional units 46 as outputs. Also provided is a buffer output 86. Communication connections 88 serve for the bidirectional communication between the switching module ZPS and the device control unit 45. The power supply assembly 82 also has an input 90 for a useful signal, which is connected to the signal inputs 48 of the device 40.

The power supply assembly 82 has an SMPS power supply unit 42 with optoelectronic couplers 66 for switching on/off. On the primary side the power supply unit 42 is connected to a mains terminal 44 by way of a filter 60. A device fuse 62 is likewise provided. Provided as buffer element for the energy supply of the switching module ZPS is a Super Cap 92, which is charged by way of the outputs 84 and a diode when the power supply unit 42 is switched on. The power supply assembly 82 has a switch 52 and an infrared detector diode 54. These elements are positioned on the front of the device 40. For this purpose either the power supply assembly 82 must be fitted inside the device 40, so that the elements 52 and 54 are accessible from the front, or these elements must be provided separately on the front and be connected to corresponding terminals of the power supply assembly 82. By virtue of the function the embodiment of the invention shown in FIG. 8 corresponds to the first embodiment of an electrical device as shown in FIG. 3, so that what has been said there applies here likewise. Simply from the arrangement of the elements, the assembly ZPS is already part of the mains assembly 82. In this way the power supply unit 42, its drive (here, by way of example, the optoelectronic coupler 66) and the switching module ZPS can be best tuned to one another.

All the examples of the invention elucidated above are to be regarded as exemplary combinations of the elements used in each case, other combinations of the individual elements (e.g. circuit by relay/circuit by optoelectronic coupler, buffering by battery/capacitor/Super Cap/accumulator, etc.) also being possible in each case.

Other extensions of the invention or of the embodiments of the invention referred to above are the following:

Instead of the combination of a power supply unit 42 with a switching module ZPS in a power supply assembly 82, as described in FIG. 8, a microcontroller provided for the control of an electrical device (device control unit 45) can also—for example by integration of hardware of equivalent function within the microcontroller or by integration of the two functional elements in a common package—be provided with the functions as switching module ZPS. In this case the "standby circuit" is no longer necessary as a separate component of an electrical device.

In the aforementioned examples of embodiments an infrared diode was in each case connected directly to a signal input of the switching module ZPS. Instead of such a diode a ready-made infrared detector module can also be used, which performs a preprocessing of the detected signals and preferably produces a digital signal.

An infrared diode connected as a detector for remote control signals requires an amplifier and a power supply for bias current. Alternatively, such a diode can also be operated in a photovoltaic operating mode. In such an operating mode the diode is not used as a variable resistor, but when struck by infrared light a (low) voltage is generated at the diode in consequence. To achieve especially low power consumption at no-load, the diode could be connected so that at no-load (i.e. when there are no signals present) it is first switched in the photovoltaic operating mode. Only when the voltage occurring because of a signal is detected is the diode switched to the more sensitive, photoresistive mode usual for detection circuits and used as a conventional IR detector diode, so that the signals can be received and processed.

Particularly in the third embodiment of the invention (FIG. 5) the communication terminal 9, 10 with the bidirectional optoelectronic coupler 78, 80 is a relatively expensive solution. As an alternative to this a simply unidirectional interface can also be provided, with which data can only be transmitted from the switching module ZPS to the device control unit 45. In this cost-saving solution, on activation by the remote control input 5, the switching module ZPS will send the detected remote control codes via the unidirectional interface after a suitably proportioned switch-on delay (for starting the device control unit 45). This solution can also be combined very well with the embodiment of the invention shown in FIG. 8 (switching module ZPS integrated with power supply assembly 82). As a further alternative the optoelectronic coupler present in many SMPSs anyway can also be used for the interface.

The time switch clock function can be used to switch such devices to the power-down mode that have to be powered up at certain, specified times. For example, set-top boxes, which receive program information at predetermined times, or video recorders, whose timers are controlled according to the type of VPS, can also be switched to a power-down mode in this way in which the corresponding power supply unit is switched off.

The remote control functionality has been elucidated here using the example of the usual infrared remote control. The expert can apply this without difficulty to other forms of remote control (e.g. radio, ultrasound, etc.), taking account of the respective peculiarities and requirements (signal form, detection, reception, processing, encoding and decoding, etc.) according to the signal type chosen.

The invention claimed is:

1. A standby circuit for an electrical device having
one or more signal inputs and
a control unit and
a control output for the control of a power supply unit,
in which the control unit initiates an activation procedure on the occurrence of a predefined activation event at the signal input,
in which a signal to switch on a power supply unit is generated at the control output;
further comprising a programming interface for programming the control unit, wherein the programming determines how the control unit responds to inputs from the one or more signal inputs.

2. A standby circuit as claimed in claim 1, in which one of the signal inputs is a useful signal input for a useful signal of an electrical device.

3. A standby circuit as claimed in claim 1, in which one of the signal inputs is a switch input for the connection of a button.

4. A standby circuit as claimed in claim 1, in which one of the signal inputs is a remote control input for the signals from a wireless remote control.

5. A standby circuit as claimed in claim 4, in which the signal input for the connection of an infrared sensor element is suitable for the detection of the signals from an infrared remote control.

6. A standby circuit as claimed in claim 1, in which one of the signal inputs is a digital data input, which can be connected to any digital interface, such as computer networks.

7. A standby circuit as claimed in claim 1, in which a store is provided.

8. A standby circuit as claimed in claim 1, in which a clock is provided.

9. A standby circuit as claimed in claim 8, in which
the control unit performs a time switch function,
in which an activation time is preset, and the activation procedure is initiated on reaching the activation time.

10. A standby circuit as claimed in claim 1, in which one or more clock inputs are provided.

11. A standby circuit as claimed in claim 1, in which one or more communication terminals are provided for sending and/or receiving data to/from the control unit and/or the store.

12. A standby circuit as claimed in claim 1, in which the circuit is constructed as a single integrated component.

13. A standby circuit as claimed in claim 1, in which the control unit forwards the signals arriving at the remote control input via a communication terminal.

14. A standby circuit as claimed in claim 1, in which
a store stores remote control activation signals,
the control unit compares signals arriving at the remote control input with the stored activation signals,
and if they match initiates the activation procedure.

15. An electrical device with
one or more functional units
and a power supply unit for connection to a power supply and for feeding the functional units with electrical energy, characterized in that
the device is switchable into a power-down mode, in which the power supply unit is switched off and draws no further electrical power from an external electrical power source, while a standby circuit remains active, which switches on the power supply unit of the device at the occurrence of an activation event,
an energy store configured to supply stored electrical energy to the standby circuit while the power supply unit is switched off and draws no further electrical power from an external electrical power source;
in which the energy store is a rechargeable element, while the energy store is charged when the power supply unit is switched on; and
in which;
the control unit of the standby circuit is programmed when the device is switched to the power-down mode so that,
after a predetermined period of time the device is switched back to the power-up mode, so that the energy store is charged again,
while the period of time is calculated so that the rechargeable element supplies sufficient electrical energy for the operation of the standby circuit for this period of time.

16. An electrical device as claimed in claim 15 comprising a standby circuit.

17. An electrical device as claimed in claim 15, comprising a circuit for monitoring the remaining content of the energy store.

18. A method for the control of an electrical device, in which an electrical device, which has one or more functional units and at least one power supply unit for feeding the functional units with electrical energy, is switched from a power-up mode to a power-down mode, while at least one power supply unit is switched on in the power-up mode and all the power supply units are switched off in the power-down mode, but while a standby circuit remains active in the power-down mode, which standby circuit monitors one or more signal inputs for the occurrence of an activation event, and which switches the device from the power-down mode to the power-up mode again at the occurrence of an activation event, and in which the standby circuit is programmed by way of a communication interface and which bi-directional data exchange occurs between the standby circuit and the one or more functional units.

19. A method as claimed in claim 18, in which
the initiating activation event is stored in the standby circuit,
and is interrogated after the device has been switched on.

* * * * *